United States Patent [19]
Muraki et al.

[11] Patent Number: 5,599,612
[45] Date of Patent: Feb. 4, 1997

[54] WOVEN CARBON FIBER FABRIC

[75] Inventors: Toshio Muraki, Matsuyama; Masazumi Tokunou; Ryuji Sawaoka, both of Ehime-ken; Masahiko Hayashi, Iyo; Toshiaki Higashi, Ehime-ken; Tokuo Tazaki, Matsuyama, all of Japan

[73] Assignee: Toray Industries, Inc., Japan

[21] Appl. No.: 408,730

[22] Filed: Mar. 22, 1995

[30] Foreign Application Priority Data

Mar. 31, 1994 [JP] Japan .................................. 6-063151

[51] Int. Cl.$^6$ ........................................... B32B 7/00
[52] U.S. Cl. ........................... 442/60; 428/408; 428/413; 428/902; 442/71; 442/175
[58] Field of Search ..................................... 428/229, 265, 428/272, 408, 902, 413

[56] References Cited

U.S. PATENT DOCUMENTS

| | | | |
|---|---|---|---|
| 4,563,232 | 1/1986 | Peake | 156/182 |
| 4,970,261 | 11/1990 | Yu et al. | 524/609 |
| 5,344,515 | 9/1994 | Chenock, Jr. | 156/171 |
| 5,401,564 | 3/1995 | Lee et al. | 428/228 |
| 5,447,785 | 9/1995 | Kishi et al. | 428/229 |

*Primary Examiner*—James J. Bell
*Attorney, Agent, or Firm*—Austin R. Miller

[57] ABSTRACT

A prepreg precursor including a carbon fiber woven fabric having applied to the fabric between about 0.5 to about 10 wt % of a stabilizer material for stabilizing the structural form of the fabric. Prepregs can then be produced using the woven fabric. Undesired settlement of matrix resin from the surface of the woven fabric is thus prevented. Hence, compared with a prepreg prepared using conventional woven fabric, a prepreg prepared by using the woven fabric of the invention can hold its tackiness for a long time and can be used to produce a fiber reinforced composite material excellent in smoothness without being devoid of surface resin.

9 Claims, No Drawings

WOVEN CARBON FIBER FABRIC

BACKGROUND OF THE INVENTION

1. Field of the Invention

The present invention relates to a woven carbon fiber fabric as a precursor for a prepreg, a prepreg produced from the precursor, processes for producing a carbon fiber reinforced composite material from the precursor, a carbon fiber reinforced composite material produced from the precursor, and a process for the production of the carbon fiber reinforced composite material.

2. Description of the Related Art

Since composite materials produced from prepregs consisting of carbon fibers and a matrix resin have excellent mechanical properties, they are widely used in sporting equipment such as in golf clubs, tennis rackets, fishing rods, etc., and in aircraft production as structural materials, and for other applications.

The reinforcing fibers used in carbon fiber reinforced composite materials are usually in the form of woven fabrics which provide excellent formability and mechanical properties. Such a composite material can be produced by overlapping a plurality of prepreg sheets, then heating and hardening the matrix resin to form a composite material. The prepreg sheets are laminated with the carbon fibers oriented in a desired direction, which keeps the formed product void-less and compact. The prepreg must also have moderate tackiness and drapability to assure good handling convenience.

A woven carbon fiber is usually composed of warp and weft threads which are crimped in the thickness direction of the woven fabric. When the woven carbon fiber fabric is impregnated with a matrix resin to make a prepreg, the impregnation pressure flattens the fabric, thus causing a resin layer to be formed on the surface. The viscosity of the resin makes the prepreg moderately tacky. However, the crimped warp or weft threads spring back due to their original shape, resulting in a settlement of the resin on the surface of the prepreg to inside the woven fabric. Therefore, if the prepreg is allowed to stand at room temperature, the amount of resin on the surface of the prepreg decreases which lowers the tackiness of the prepreg. Moreover, if sheets of the prepreg are laminated and formed, the formed product lacks resin on its surface so as to lose smoothness.

JP-A-86-34244 describes a conventional method for stabilizing the structural form of a woven carbon fiber fabric by bonding the intersections of warp and weft threads with copolymer nylon. While this method is effective for securing the meshes of the weave and preventing the woven threads from being frayed in the carbon fiber woven fabric, it fails to keep the prepreg tacky for an extended time.

SUMMARY OF THE INVENTION

An object of the invention is to provide a prepreg precursor comprising a woven carbon fiber fabric having crimped threads which excels in structural form-holding stability by preventing the crimped threads from springing back to a previous configuration.

Another object of the invention is to provide a prepreg with excellent structural stability and enduring tackiness suitable for producing a fiber reinforced composite material with excellent surface smoothness.

According to the invention, a prepreg precursor is provided comprising a woven carbon fiber fabric having a novel stabilizer material applied to the fabric in an amount of about 0.5 to 10 wt % by weight of fibrous material of the fabric to stabilize the fabric structure.

The invention further provides a prepreg precursor comprising a fabric woven from carbon fiber and having applied to the fabric a compound capable of hardening, preferably at low temperature, more preferably at a temperature $\leq 120°$ C., an epoxy resin subsequently applied to the fabric so as to provide, on hardening, about 0.5 to 10 wt % of hardened epoxy resin by weight of fibrous material of the fabric stabilizing the fabric structure.

Another aspect of the invention provides a process for stabilizing the structure of a woven carbon fiber fabric which comprises applying to a woven fiber fabric from a stabilizer material in an amount from about 0.5 to 10 wt % by weight of fibrous material of the fabric to stabilize the fabric structure and allow the material to harden.

Preferably, about 0.5 to 10 wt % (based on fibrous material weight) of the stabilizer material is deposited on a fabric woven from carbon fiber bundles.

Another aspect of the invention is a prepreg comprising a woven carbon fiber fabric carrying a stabilizer material as described above and an epoxy resin composition.

In another aspect of the invention, a process for preparing a prepreg comprising applying to a woven carbon fiber fabric a stabilizer material in an amount from about 0.5 to 10 wt % based on the weight of fibrous material of the fabric. The woven fabric carrying the stabilizer material is then impregnated with an epoxy resin composition.

The invention further provides a process for preparing a prepreg which involves applying to a woven carbon fiber fabric a low-temperature epoxy resin hardener, impregnating the fabric carrying the hardener with an epoxy resin composition, and simultaneously or subsequently hardening, at least partially, a part of the epoxy resin composition by the hardener. Preferably, a part of the epoxy resin is at least almost fully cured, more preferably at least 90% cured, if not fully cured.

Another aspect of the present invention provides a fiber reinforced composite material comprising at least one hardened prepreg as described above.

DESCRIPTION OF THE PREFERRED EMBODIMENTS

Preferred embodiments of the present invention will now be described in detail. The compositions and methods described illustrate specific examples of the invention and are not intended to limit the scope of the invention defined in the appended claims.

A woven carbon fiber fabric may be obtained by weaving carbon fiber bundles into any conventional two-dimensional woven fabric. It is preferable that a biaxial weave is used in which warp and weft threads are crossed at right angles such as in a plain weave or satin weave. Furthermore, the woven fabric preferably has a cover factor (as further defined herein) of about 90 to 99.8%, more preferably about 95 to 99.8%, to diminish crimping at the intersections of fibers and to provide excellent smoothness.

The expression "cover factor" of a woven fabric is a value measured as described below. A stereoscopic microscope is used to photograph the surface of the woven fabric while irradiating the backside of woven fabric with light. The transmitted light pattern of the woven fabric in this case is black in the thread portions and white in the mesh portions. The quantity of light should be set at a level below that which would cause halation. The magnification should be such that about 2 to 20 threads of warp and weft may be seen in the image. A photograph is subsequently taken by a CCD (charge couple device) camera, which converts the image into digital data expressing the white and black portions, and the data are stored in a memory and analyzed by an image processor. With reference to the whole area $S_1$ and the white portion (mesh portion) area $S_2$, the cover factor $C_f$ (%) is calculated from the following equation:

$$C_f = |(S_1 - S_2)/S_1| \times 100$$

In the invention, a woven carbon fiber fabric of a prepreg precursor has a stabilizer material deposited on it to stabilize the structural form of the fabric. Preferably, the stabilizer material not only bonds the intersections of the warp and weft threads constituting the woven fabric, but also fastens carbon fiber bundles of both the warp and weft threads and maintains the relative positions of the mono-filaments constituting the carbon fiber bundles. It is preferable that the stabilizer material be deposited substantially over the whole surface of the carbon fiber woven fabric as well as substantially over all the surfaces of the mono-filaments constituting the carbon fiber bundles. A woven carbon fiber fabric of a precursor prepreg of the invention may have crimped component threads which are prevented from springing back by the stabilizing material thus stabilizing the structural form of the fabric. A prepreg prepared by using such a precursor can retain its tackiness for a long time because the matrix resin on the surface of the prepreg cannot easily settle into the woven fabric.

The stabilizer material used in a prepreg precursor of the invention can be a hardened thermosetting resin or a thermoplastic resin. The hardened thermosetting resin may be a hardened thermosetting resin or thermosetting resin composition.

The thermosetting resin can be selected from epoxy resins, bismaleimide resins, polyimide resins, etc. Epoxy resins are often preferable. Specific epoxy resins include epoxy resins with an amine as a precursor such as tetraglycidyl diaminodiphenylmethane, triglycidyl-o-aminophenol and triglycidyl-m-aminophenol, and epoxy resins with a phenol as a precursor such as bisphenol A type epoxy resin, bisphenol F type epoxy resin, bisphenol S type epoxy resin, phenol novolak type epoxy resin and cresol novolak type epoxy resin.

The thermosetting resin compositions preferably include mixtures consisting of a thermosetting resin composition such as an epoxy resin and a hardener. The hardener used in combination with an epoxy resin can be selected, for example, from a dicyandiamide, a diaminodiphenylsulfone, or from aminobenzoates and various acid anhydrides. Furthermore, a low temperature setting type amine compound such as an aliphatic amine, xylylenediamine, piperazine or imidazole compound can also be preferably used.

The thermosetting resin composition can also contain nitrile rubber or any thermoplastic resin described later, for adjusting the bending resistance and form stability of the woven fabric. Thus, the thermosetting resin composition may comprise substantially, and preferably at least about 50% (by weight of the total composition), epoxy resin, hardener and solid nitrile rubber.

The stabilizer material can alternatively or additionally be a thermoplastic resin of polyamide, polyester, polyether imide, polysulfone, polyether sulfone or polyvinyl formal, among others.

If the glass transition temperature of the stabilizer material is too low, the heat history may impair the structural form stability of the woven fabric when the prepreg is prepared. Therefore, the glass transition temperature is preferably at least about 70° C.

The quantity of the stabilizer material deposited on the fabric should be about 0.5 to 10.0 wt %, preferably about 0.5 to 5.0 wt %, and more preferably about 1.0 to 4.0 wt % based on the weight of fibrous material of the carbon fiber woven fabric. If the quantity deposited is less than about 0.5 wt %, the woven fabric possesses insufficient structural form stability. Conversely, if more than about 10 wt % is deposited, the matrix resin impregnability during the production of the prepreg is lowered, which lowers the quality of the prepreg.

The quantity of stabilizer material deposited on the carbon fiber woven fabric can be measured by the nitric acid decomposition method or solvent extraction method described below.

Nitric Acid Decomposition Testing Method

As an example of this method, a woven carbon fiber fabric having a deposited stabilizer material is cut into a 10 cm×10 cm piece which is weighted ($W_1$) and put into a 300 ml beaker. Fifty milliliters of nitric acid is poured into it, and the contents are stirred at 50° C. for 15 minutes. Nitric acid is decanted carefully so as not to allow the carbon fibers to flow out. The decomposition treatment by nitric acid is repeated twice further, and the carbon fibers are washed with water. The washing is repeated until the washing water becomes neutral. The remaining carbon fibers are dried in a hot air dryer at 120° C. for 30 minutes, and weighted ($W_2$).

Solvent Extraction Method

As an example, a woven carbon fiber fabric having a deposited stabilizer material is cut into a 10 cm×10 cm piece which is weighed ($W_1$) and put into a 300 ml beaker. One hundred milliliters of methyl ethyl ketone is added as a solvent, and the contents are stirred at room temperature for 15 minutes. The solvent is decanted carefully so as not to allow the carbon fibers to flow out. The extraction with methyl ethyl ketone is repeated, followed by an extraction with methylene chloride. The remaining carbon fibers are dried in a hot air dryer at 120° C. for 30 minutes, and weighed ($W_2$).

In either the nitric acid decomposition method or solvent extraction method, the quantity of the stabilizer material deposited is obtained from the following equation:

$$\text{Deposition (\%)} = \{(W_1 - W_2)/W_2\} \times 100$$

The bending resistance of the carbon fiber woven fabric with a deposited stabilizer material affects the drapability of the prepreg obtained from the woven fabric. If the bending resistance value of the woven fabric is too large, the structural stability of the woven fabric is poor, and the prepreg obtained from the woven fabric may quickly lose tackiness, while the woven fabric itself becomes difficult to handle. If the bending resistance value of the woven fabric is too small, the woven fabric becomes rigid and loses drapability, and the prepreg obtained from the woven fabric may also lose drapability. Thus, the bending resistance value of the woven fabric should be preferably about 20 to 150 mm, and to ensure a better impregnability as a prepreg, it should be more preferably about 30 to 100 min.

The bending resistance value of a woven carbon fiber fabric is expressed as a displacement and is measured as described below. A 30 mm wide by 200 mm long sample is prepared, as to have the weft threads of the woven carbon fiber fabric in the longitudinal direction. The sample is set on a horizontal test bench with a 150 mm portion extending from the end of the test bench, and held for 10 minutes. Displacement at the sample tip is then measured.

An example of a method of producing woven carbon fiber fabric in accordance with the invention is described below.

First, a woven fabric with carbon multi-filaments as warp and weft threads is obtained by ordinary weaving. The unit weight of the woven fabric is preferably in a range from about 120 to 250 g/m$^2$.

The woven fabric is preferably subjected to the following opening treatment to produce a cover factor in the preferred range of about 90.0 to 99.8% and more preferably from about 95.0 to 99.8%.

To prevent the weft threads of the woven carbon fiber fabric from being frayed and/or to effectively perform the opening treatment which provides a woven fabric less bowed-filled with weft threads (i.e. to minimize bowing of the weft threads), the weft threads include curbing threads providing bordering at both ends of the woven fabric. A single curbing thread on each side of the weft threads can provide effective curbing, but preferably pairs of curbing threads are used as in the plain weave or leno weave. If the number of curbing threads used for the ends of the woven fabric is too large, the very strong curbing effect does not allow sufficient opening or widening of the woven fabric during opening treatment, and, as a result, the woven fabric is opened and differently widened between the end portions and the central portion (i.e. in a region other than at both ends). Furthermore, during the opening treatment, the woven carbon fiber fabric is elongated more at the central portion than at both ends, causing the woven fabric to be bowed-filled with weft threads. Thus, if the number of curbing threads is about 10 or less at each end, the opening treatment described later can be performed effectively.

The woven carbon fiber fabric is subsequently subjected to an opening treatment. The woven carbon fiber fabric preferably travels continuously in the warp direction, while jets of water are injected by a plurality of nozzles arranged as a row in the weft direction of the woven fabric to effect opening. Any water deposited in the woven fabric is removed by drying. The dryer used for removing the water is not especially limited, and can be any horizontal type, vertical type, hot air circulation type, or infrared ray heating type. However, if the woven fabric is tensioned more than necessary during drying, elongation may occur between the ends and the central portion of the woven carbon fiber fabric. Thus, as a drying method to prevent the woven fabric from being tensioned more than necessary, a belt conveyor type dryer is preferably used.

A stabilizer material for stabilizing the structural form of the fabric is applied to the woven carbon fiber fabric thusly obtained.

In one method for applying a stabilizer material to the woven carbon fiber fabric, the fabric is immersed in an organic solvent solution in which a stabilizer material is dissolved, and the solvent is then removed. The woven fabric is immersed in a solution with an epoxy resin and a hardener dissolved in a solvent such as methyl ethyl ketone or acetone, and the solvent is then removed at room temperature or by heating, and the fabric is further heated to allow the hardener to harden the epoxy resin. In another preferable method, a woven fabric with a deposited epoxy resin can be treated with an aqueous or organic solvent solution containing a hardener, after which the solvent is removed, and the fabric heated to harden the epoxy resin.

If a thermoplastic resin such as a polyether imide is used as the stabilizer material, the woven carbon fiber fabric can be immersed in a solution of thermoplastic resin dissolved in a chlorine-based solvent such a methylene chloride or chloroform, or a solvent such a dimethylacetamide or N-methyl-2-pyrrolidone, after which the solvent is removed. If required, the fabric may then be heat-treated to apply the stabilizer material to the woven fabric.

In another method of applying the stabilizer material, the woven fabric can be treated with a mixture consisting of an epoxy resin water emulsion and a hardener or a thermoplastics resin water emulsion, after which the water is removed and, if required, the fabric may then be heat-treated. In this method, it is preferable to add an emulsifier such as polyvinyl alcohol to the water to provide a highly stable emulsion.

The quantity of stabilizer material deposited can be controlled by adjusting the concentration of the solution or emulsion, or by adjusting the quantity of the solution or emulsion picked up by the woven fabric immersed in the solution or emulsion through the use of a squeezing roll, etc.

Furthermore, the bending resistance of the woven fabric can be adjusted to within a preferred range as previously described by selecting the stabilizer material used, the quantity deposited, etc.

The precursor prepreg of the invention comprising the treated woven carbon fiber fabric may then be converted into a prepreg in which an epoxy resin composition, with an epoxy resin and a hardener as essential components, acts as a matrix.

The epoxy resin used in a prepreg of the invention is not especially limited, and may preferably be selected from epoxy resins derived from an amine or phenol, etc. as a precursor.

Specifically, epoxy resins derived from an amine as a precursor include tetraglycidyl diaminodiphenylmethane, triglycidyl-p-aminophenol, triglycidyl-m-aminophenol and triglycidyl aminocresol. Tetraglycidyl diaminodiphenylmethane can be especially preferably used since the hardened material obtained can possess excellent heat resistance.

Epoxy resins derived from a phenol as a precursor include bisphenol A type epoxy resin, bisphenol F type epoxy resin, bisphenol S type epoxy resin, phenol novolak type epoxy resin, cresol novolak type epoxy resin and resorcinol type epoxy resin. In particular, since liquid bisphenol A type epoxy resin and bisphenol F type epoxy resin are low in viscosity, they can be preferably used with another epoxy resin or additive to adjust the tackiness and viscosity of the epoxy resin composition.

Furthermore, these epoxy resins can be used singly or in any suitable combination. A mixture consisting of a glycidyl amine type epoxy resin and a glycidyl ether type epoxy resin can be preferably used since it enables the prepreg to be tacky and drapable and the hardened material to be heat resistant.

The hardener used in combination with the epoxy resin is not especially limited and can be selected from generally used hardeners for epoxy resins. Examples include dicyandiamide, diaminodiphenylsulfone, aminobenzoates, various acid anhydrides, etc. Dicyandiamide can be preferably used since it provides excellent storage stability for the prepreg. If an aromatic diamine such as diaminodiphenylsulfone is used as the hardener, the hardened epoxy resin obtained possesses good heat resistance. It is also possible to use a urea compound, boron trifluoride amine salt or imidazole compound, etc. alone or in combination with any of the above hardeners.

The epoxy resin composition consisting of an epoxy resin and a hardener can contain a high polymer. Examples include a thermoplastic resin such as polyether sulfone, polyether imide or polyvinyl formal, or, when used, nitrile rubber. The high polymer added can enhance the toughness of the hardened material. Furthermore, enhancing the viscosity of the resin effectively controls the settlement of the resin on the surface of the prepreg. Among the above-mentioned high polymers, highly flexible solid nitrile rubber can be preferably used since it provides a resin high in viscosity without impairing the tackiness of the matrix itself. In particular, a preferred epoxy resin matrix composition comprises at least substantially, and more preferably at least about 50% (by weight of the total composition), epoxy resin, hardener and solid nitrile rubber.

Moreover, in a prepreg in which both the stabilizer material and the matrix is an epoxy resin composition containing a hardener for the epoxy resin, whether prepared by (1) first applying to the fabric an epoxy resin composition containing a hardener and hardening to make a prepreg precursor and thereafter impregnating the precursor with epoxy resin or (2) first applying to the fabric a hardener alone to make a prepreg precursor and thereafter impregnating the precursor with epoxy resin, the total composition comprising epoxy resin and hardener preferably comprises at least substantially, and more preferably at least about 50% (by weight of the total composition), epoxy resin, hardener and solid nitrile rubber.

The quantity of stabilizer material deposited on the woven carbon fiber fabric in the prepreg can be measured by extracting and removing from the prepreg the epoxy resin using methyl ethyl ketone and thereafter determining the amount of stabilizer present on the remaining fabric using the methods previously described.

The bending resistance value of the prepreg should be preferably about 50 to 150 mm, more preferably about 70 to 120 mm. If the value is too small, the prepreg may not be flexible, and if the value is too large, the prepreg becomes soft so as to make handling of the prepreg difficult.

The bending resistance of the prepreg can be measured in the same manner as that adopted for measuring the bending resistance of the woven fabric, namely by cutting off a 30 mm wide by 200 mm long sample from the prepreg with the weft threads of the component woven fabric kept in a longitudinal direction, setting the sample on a horizontal test bench with a 150 mm portion protruding from the edge of the test bench, holding for 10 minutes, and measuring the displacement at the sample tip.

The prepreg of the present invention should preferably have a cover factor of at least about 95%, more preferably at least about 97.0%, to prevent the resin on the surface from settling, for maintaining tackiness for a long time and to keep the surface of the molded product smooth. The cover factor of the prepreg can be measured in the same manner as that adopted for measuring the cover factor of the woven fabric.

The prepreg of the present invention can be prepared by a conventional hot melt method to impregnate the woven fabric with the matrix resin under heating and pressurization or a conventional wet method to impregnate the woven fabric with the matrix resin using a solution of the resin dissolved in an organic solvent, except that the woven fabric is a woven carbon fiber fabric carrying a stabilizer material for stabilizing the structural form of the fabric.

An especially preferable process for preparing the prepreg of the present invention is described below. That is, a woven carbon fiber fabric on which is deposited a low temperature type epoxy resin hardener, preferably capable of hardening at a temperature $\leq 120°$ C., more preferably $\leq 100°$ C., is impregnated with an epoxy resin composition used as the matrix, and, simultaneously or subsequently, a portion (preferably 20% by weight) of the total epoxy resin composition within the fabric is at least partially hardened by the low temperature type hardener. That parts of the epoxy resin composition which is hardened should be sufficiently hardened, for example at least 90% cured, to stabilize the structural form of the woven fabric.

The process allows the production of a prepreg excellent in impregnability at a milder impregnation temperature or pressure compared with a process in which a woven fabric is first stabilized in structural form by depositing on it a thermosetting or thermoplastic resin and allowing it to harden and subsequently impregnating the resultant fabric with an epoxy resin composition.

The low temperature type epoxy resin hardener refers to a hardener which hardens the epoxy resin at a temperature lower than the hardener contained in the epoxy resin composition used as the matrix, which preferably hardens at a temperature of at least 150° C., more preferably at least 170° C. If a hardener which hardens the epoxy resin at a high temperature is used, it is necessary to heat at a temperature higher or for a time longer than that ordinarily required for producing the prepreg in order to harden the matrix resin near the woven fabric. As a result, the hardener contained in the matrix also simultaneously hardens the entire epoxy resin composition used as the matrix, thus impairing the drapability of the prepreg.

The low temperature type hardener may be a hardener which hardens the epoxy resin at a temperature of from about 0° C. to about 120° C. inclusive, preferably at a temperature of from room temperature (about 20° C.) to about 100° C., more preferably to a temperature lower than 100° C., especially about 90° C., and can be typically selected from aliphatic amines such as hexamethylenediamine and diethylenetriamine, xylylenediamine, piperazine and imidazole compounds. The quantity of low temperature type hardener based on the weight of fibrous material of the woven carbon fiber fabric depends on the hardener used and desired performance of the prepreg, but is usually about 0.1 to 1 wt %.

Sheets of the prepreg of the present invention are laminated with epoxy resin, and hardened, preferably at a temperature of at least about 150° C. up to about 200° C., more preferably at least about 170° C. up to about 190° C., to form a fiber reinforced composite material with excellent surface smoothness.

Especially preferred embodiments of the present invention will now be described in more detail with reference to the following Examples. The Examples are illustrative and are not intended to limit the scope of the invention defined in the appended claims.

In the Examples, all parts are by weight unless otherwise stated and the quantity of the sizing material deposited was measured by the solvent extraction method in the same manner as that adopted for measuring the quantity of the stabilizer material deposited, except that the extraction by methylene chloride was not effected.

EXAMPLE 1

Nineteen parts of "Epikote" (registered trademark) 828 produced by Yuka Shell Epoxy K.K. were added to 1200 parts of an aqueous solution containing 2% of polyvinyl alcohol with a saponification degree of 90%, and the mixture was stirred by a homomixer, to prepare an epoxy resin emulsion. To the aqueous emulsion, 4.3 parts of the hardener piperazine were added and dissolved. A plain weave fabric C07373Z of carbon fibers "Torayca" (registered trademark) T300 produced by Toray Industries, Inc. (the woven fabric having a cover factor of 91.0% and on which was deposited 1.2 wt %, by weight of fabric, a sizing material) was immersed into the above-described aqueous emulsion containing the hardener in solution, and was heat-treated at 150° C. for 10 minutes using a hot air dryer to remove water and to harden the epoxy resin for service as a stabilizer for stabilizing the fabric in its existing structural form. The resulting woven fabric had a cover factor of 94.0% and a bending resistance value of 80 mm. The quantity of the deposited stabilizer material, measured by the nitric acid decomposition method, was found to be 2.1 wt % by weight of the fibrous material of the fabric. A material obtained by mixing "Epikote 828" and piperazine at the above ratio and heat-treating at 150° C. for 10 minutes had a glass transition temperature of 95° C.

Forty parts of tetraglycidyl diaminophenylmethane (EIM434 produced by Sumitomo Chemical Co., Ltd), 20 parts of bisphenol F type epoxy (Epc830 produced by Dainippon Ink & Chemicals, Inc.), 63 parts of brominated bisphenol A type epoxy (Epc152 produced by Dainippon Ink & Chemicals, Inc.), 127 parts of bisphenol A type epoxy (Ep828 produced by Yuka Shell Epoxy K.K.), 80 parts of 4,4'-diaminodiphenylsulfone and 25 parts of solid nitrile rubber "Nippole" (registered trademark) 1072 produced by Nippon Zeon Co., Ltd. were kneaded by a kneader, to prepare an epoxy resin composition for a prepreg. The composition was applied to releasing paper heated at 80° C. to prepare a resin film. The resin film was laminated on both sides of the above woven fabric, and an impregnating apparatus was used to impregnate the woven fabric with the resin at 100° C. at an impregnation pressure of 4 kgf/cm$^2$. The prepreg which was thereby produced had a cover factor of 95.4%, a bending resistance value of 120 mm and a carbon fiber content of 60%, by weight of total prepreg.

The prepreg had a moderate drapability and tackiness. The prepreg was allowed to stand in an atmosphere of 25° C. and 40% relative humidity for 10 days, and still had moderate but adequate drapability and tackiness.

EXAMPLE 2

Polyether imide "Ultem" (registered trademark) 100 (glass transition temperature of 215° C.) produced by GE Plastic K.K. was dissolved into dimethylacetamide, to prepare a 2% solution. Into the solution, a woven carbon fiber fabric C07373Z was immersed then dried at 200° C. for 2 hours using a hot air dryer. The quantity of the stabilizer material thus deposited on the woven fabric was measured by the solvent extraction method and found to be 1.8% by weight of the fibrous material of the fabric. The woven fabric had a cover factor of 92.5% and a bending resistance value of 60 mm.

The woven carbon fiber fabric was used to prepare a prepreg as in Example 1. The prepreg obtained had a cover factor of 93.5%, a bending resistance value of 100 mm and a carbon fiber content of 60 wt % by weight of total prepreg.

The prepreg had moderate but adequate drapability and tackiness. The prepreg was allowed to stand in an atmosphere of 25° C. and 40% relative humidity for 10 days, and still had moderate drapability and tackiness.

COMPARATIVE EXAMPLE 1

A woven carbon fiber fabric with a stabilizer material deposited on it was obtained as in Example 2, except that the dimethylacetamide solution used contained 0.3% by polyether imide. The quantity of stabilizer material in the fabric obtained, based on the weight of the woven fabric, was measured by the solvent extraction method and found to be 0.05%. The woven fabric had a cover factor of 93.0% and a bending resistance value of 130 mm.

The carbon fiber fabric was used to prepare a prepreg as in Example 1. The prepreg obtained had a cover factor of 96.0%, a bending resistance value of 136 mm and a carbon fiber content of 60 wt % by weight of total prepreg. The prepreg obtained had moderate tackiness in the beginning, but after it had been allowed to stand in an atmosphere of 25° C. and 40% relative humidity for 5 days, little tackiness remained.

COMPARATIVE EXAMPLE 2

A woven carbon fiber fabric with a stabilizer material deposited on it was obtained as in Example 2, except that the dimethylacetamide solution contained 4.0% polyether imide. The quantity of the stabilizer material deposited on the woven fabric was measured by the solvent extraction method and found to be 5.5% by weight of the fibrous material of the woven fabric. The woven fabric had a cover factor of 93.1% and a bending resistance value of 15 mm.

The woven carbon fiber fabric was used to prepare a prepreg as in Example 1. The prepreg obtained had a cover factor of 93.1%, a bending resistance value of 30 mm and a carbon fiber content of 60 wt % by weight of total prepreg. The prepreg obtained had moderate tackiness, but was rigid and thus poor in drapability. The prepreg was allowed to stand in an atmosphere of 25° C. and 40% relative humidity for 10 days, and also found to have moderate tackiness but poor drapability.

EXAMPLE 3

A plain weave carbon fiber fabric C07373Z produced by Toray Industries, Inc. was continuously fed in the warp direction while its warp and weft threads were opened and widened by means of a 5.0 kgf/cm$^2$ water jet ejected from a plurality of nozzles arranged in a row in the weft direction of the woven fabric at a water temperature of 35° C. Then, the fabric was dried at 140° C. for 3 minutes using a horizontal hot air dryer. The quantity of sizing material deposited in the woven fabric after drying was 0.7 wt % by weight of fabric. The woven fabric was immersed in an aqueous solution with 0.5 wt % of metaxylylenediamine dissolved, and dried by a hot air dryer is as to deposit metaxylylenediamine on the surface of the fibers. The woven carbon fiber fabric obtained had a cover factor of 99.0% and a bending resistance value of 70 mm.

Subsequently, an epoxy resin film like that used for lamination in Example 1 was used for lamination on both sides of the woven fabric, and a prepreg apparatus was used for impregnation at 100° C. at an impregnation pressure of 4 kgf/cm$^2$. The prepreg obtained had a carbon fiber content of 58 wt % by weight of total prepreg, a bending resistance value of 103 mm and a cover factor of 99.5%. The prepreg had moderate tackiness and drapability. The prepreg was allowed to stand in an atmosphere of 25° C. and 40% relative humidity for 10 days, and still had moderate and acceptable drapability and tackiness.

The epoxy resin of the prepreg was extracted and removed using methyl ethyl ketone to obtain a woven fabric having a hardened epoxy resin deposited within and on the surfaces of the carbon fiber bundles. The quantity of the hardened epoxy resin deposited on the fabric was measured by the nitric acid decomposition method and found to be 2.1 wt % by weight of the fibrous material of the fabric.

EXAMPLE 4

On an aluminum tool plate covered with a silicone releasing agent, five sheets of the prepreg prepared in Example 3 were laminated, and an FEP film and a pressure plate were set over them. The entire laminate was wrapped by a nylon bag film and put into an autoclave, being heated to 180° C. at a rate of 1.5° C./min at a pressure of 3 kgf/cm$^2$ with the inside of the bag film kept under reduced pressure, and then held at the same temperature for 2 hours. It was cooled, and the surface of the hardened and formed composite material panel on the tool plate side was observed and found to be very smooth.

EXAMPLE 5

A plain weave carbon fiber fabric (103 cm in width) woven with Torayca (registered trademark; produced by Toray Industries, Inc.) T300-3K (consisting of 3,000 filaments, on which was deposited 1.2 wt % of sizing material) as weft and warp threads and with 193 g/m$^2$ of carbon fibers was curbed at both ends in the width direction by four glass fiber yarns ECD 450 1/2 4.4S (0.08 mm in outer diameter) produced by Nitto Boseki Co., Ltd. woven in a range of 7 to 10 mm inside from the ends of the woven fabric. In this case, every two glass fiber yarns formed a pair of leno weave. The woven carbon fiber fabric was opened at a water jet pressure of 5.0 kgf/cm$^2$ at a water temperature of 35° C. by water jet punching, and dried at 140° C. for 3 minutes using a horizontal hot air dryer. The quantity of sizing material deposited in the woven fabric after drying was 0.7 wt % by weight of fabric.

The woven carbon fiber fabric thus obtained was fed with a stabilizer material as in Example 1.

The woven carbon fiber fabric obtained contained 2.1% stabilizer material by weight of fibrous material of the fabric and had a cover factor of 98.0% and a bending resistance value of 75 mm.

The same epoxy resin film as that used in Example 1 was used for lamination on both sides of the woven fabric, and a prepreg apparatus was used for impregnation at 100° C. at an impregnation pressure of 4 kgf/cm$^2$. The prepreg obtained had a carbon fiber content 58 wt % of weight of total prepreg, a bending resistance value of 110 mm and a cover factor of 99.2%.

The prepreg had moderate and acceptable drapability and tackiness. The prepreg was allowed to stand in an atmosphere of 25° C. and 40% relative humidity for 10 days, and still retained moderate drapability and tackiness for its intended purposes such as manufacture of golf clubs, tennis rackets, fishing rods and similar articles, and in making structural materials for aircraft production.

As is readily apparent from the above description, prepreg according to the invention can be well utilized in the fabrication of a fiber reinforced composite material for the above-described articles. A plurality of prepreg strips may be helically wound around a form and hardened to produce a golf club shaft, for example. The remarkable combination of enduring drapability and tackiness allows for many applications of the invention.

Although this invention has been described with reference to specific forms of apparatus and method steps, equivalent steps may be substituted, the sequence of the steps may be varied, and certain steps may be used independently of others. Further, various other control steps may be included, all without departing from the spirit and the scope of the invention defined in the appended claims.

What is claimed is:

1. A prepreg precursor comprising:
  (a) carbon fiber threads woven into a carbon fiber woven fabric having a thickness, said threads of said woven fabric having points of intersection and being crimped in the direction of said fabric thickness; and
  (b) a stabilizer material, applied to said fabric for stabilizing the structural form of the fabric by promoting adhesion between said threads at said points of intersection, in an amount after hardening between about 0.5 to about 10 wt % by weight of fibrous material of the fabric;
  wherein said precursor has a bending resistance value between about 20 to about 150 mm and a cover factor between about 90 to about 99.8%, and wherein said precursor is capable of being impregnated with a matrix resin to form a prepreg such that said fabric is flattened in said thickness direction and remains in a flattened state.

2. A prepreg precursor according to claim 1, wherein the stabilizer material is a thermoset resin.

3. A prepreg precursor according to claim 2, wherein the thermoset resin is a hardened epoxy resin.

4. A prepreg precursor according to claim 1, wherein the stabilizer material is a thermoplastic resin.

5. A prepreg precursor according to claim 1, wherein the stabilizer material has a glass transition temperature of at least about 70° C.

6. A prepreg precursor comprising:
  (a) carbon fiber threads woven into a carbon fiber woven fabric having a thickness, said threads of said woven fabric having points of intersection and being crimped in the direction of said fabric thickness;
  (b) a hardening compound applied to the fabric; and
  (c) an epoxy resin, applied to the fabric after the application of the hardening compound, in an amount after hardening between about 0.5 and about 10 wt % by weight of fibrous material of the fabric, wherein a hardened epoxy resin stabilizer material is formed to stabilize the structural form of the fabric by promoting adhesion between said threads at said points of intersection;
  wherein said precursor is capable of being impregnated with a matrix resin to form a prepreg such that said fabric is flattened in said thickness direction and remains in a flattened state.

7. A prepreg comprising:
  (a) a prepreg precursor having a carbon fiber woven fabric, and a stabilizer material applied to the fabric for stabilizing the structural form of the fabric in an amount after hardening between about 0.5 to about 10 wt % by weight of fibrous material of the fabric, wherein the precursor has a bending resistance value between about 20 to about 150 mm, and a cover factor between about 90 to about 99.8%; and
  (b) an epoxy resin composition; wherein said prepreg has a bending resistance value between about 50 to about 150 mm and a cover factor of at least about 95%.

8. A prepreg according to claim 7, wherein at least about 50% by weight of the epoxy resin composition comprises an epoxy resin, a hardener and a solid nitrile rubber.

9. A fiber reinforced composite material comprising at least one hardened prepreg comprising:

(a) a prepreg precursor having a carbon fiber woven fabric, and a stabilizer material applied to the fabric for stabilizing the structural form of the fabric in an amount after hardening between about 0.5 to about 10 wt % by weight of fibrous material of the fabric, wherein the precursor has a bending resistance value between about 20 to about 150 mm, and a cover factor between about 90 to about 99.8%; and (b) an epoxy resin composition;

wherein said prepreg has a bending resistance value between about 50 to about 150 mm and a cover factor of at least about 95%.

* * * * *